(12) United States Patent
Albaisa et al.

(10) Patent No.: US 6,889,880 B2
(45) Date of Patent: May 10, 2005

(54) CONFIGURABLE VEHICLE SILL

(75) Inventors: Alfonso E. Albaisa, Chula Vista, CA (US); John Cupit, Cordiff By The Sea, CA (US)

(73) Assignee: Nissan Design America, Inc., San Diego, CA (US)

( * ) Notice: Subject to any disclaimer, the term of this patent is extended or adjusted under 35 U.S.C. 154(b) by 181 days.

(21) Appl. No.: 10/324,135

(22) Filed: Dec. 20, 2002

(65) Prior Publication Data
US 2003/0141334 A1 Jul. 31, 2003

Related U.S. Application Data

(60) Provisional application No. 60/344,344, filed on Jan. 4, 2002.

(51) Int. Cl.⁷ .............................. B60R 9/06; B60R 9/10
(52) U.S. Cl. ...................... 224/491; 224/489; 224/496; 224/497; 224/509; 224/510; 224/924
(58) Field of Search ................................ 224/489, 491, 224/496, 497, 502, 509, 510, 549, 553, 554, 924; 414/462, 546; 296/209; 280/727, 762, 769

(56) References Cited

U.S. PATENT DOCUMENTS

| | | | | |
|---|---|---|---|---|
| 3,902,752 A | * | 9/1975 | Pelletier | 280/727 |
| 3,972,456 A | * | 8/1976 | Saffold | 224/502 |
| 4,403,716 A | * | 9/1983 | Carlson et al. | 224/497 |
| 4,534,450 A | * | 8/1985 | Savaria | 414/546 |
| 4,944,434 A | * | 7/1990 | Hamilton | 224/549 |
| 5,806,736 A | * | 9/1998 | Kincart | 224/509 |
| 6,050,202 A | * | 4/2000 | Thompson | 224/553 |
| 6,422,443 B1 | * | 7/2002 | Erickson et al. | 224/924 |
| 6,547,115 B1 | * | 4/2003 | Kato et al. | 224/496 |
| 6,659,318 B2 | * | 12/2003 | Newbill | 224/553 |

* cited by examiner

Primary Examiner—Gary E. Elkins
(74) Attorney, Agent, or Firm—Foley & Lardner LLP

(57) ABSTRACT

A vehicle cargo rack is provided with a sill connected to the vehicle, at least one rotatable joint mounted on the sill, and at least one arm coupled to the at least one joint and configured to hold cargo.

19 Claims, 1 Drawing Sheet

CONFIGURABLE VEHICLE SILL

CROSS-REFERENCE TO RELATED PATENT APPLICATIONS

The Applicants claim the benefit of and priority to U.S. Provisional Patent Application No. 60/344,344 filed on Jan. 4, 2002, the entire contents of which are incorporated by reference herein in its entirety.

BACKGROUND OF THE INVENTION

A. Field of the Invention

The invention relates generally to vehicle cargo racks, more particularly, to cargo racks being positionable in at least a deployed position and a stored position.

B. Detailed Description of the Related Art

Vehicle cargo racks are commonly used to provide additional storage capacity for items such as bicycles, skis, cargo boxes, kayaks, and the like. Aftermarket "strap on" cargo racks are available to attach bicycles and the like to a rearward surface of a vehicle such as a minivan or sport utility vehicle. While removable strap-on racks can be taken off, they are often difficult to install and remove. Often, several straps, hooks, snaps, clamps and other fasteners are used to securely fasten the rack to the vehicle, which may take considerable time to set up and may be difficult for an individual to perform alone. Furthermore, fasteners can scratch, dent, or otherwise damage the underlying paint or body panel, which can lead to accelerated corrosion, and generally detracts from the vehicle's appearance.

Thus, a need exists for a vehicle cargo rack that is positionable in a deployed position and a stored position without having to be removed from the vehicle.

SUMMARY OF THE INVENTION

According to one embodiment of the present invention, an integrated bike rack for a vehicle is provided, comprising a sill horizontally slidably connected to the vehicle, and a rack vertically slidably connected to the sill. The rack comprises at least two horizontally rotatable joints, each joint having an arm configured to support a bicycle.

According to another embodiment of the present invention, a vehicle cargo rack is provided, comprising a sill connected to the vehicle, at least one rotatable joint mounted on the sill, and at least one arm coupled to the at least one rotatable joint and configured to hold cargo.

According to another embodiment of the present invention, a method of securing cargo to a vehicle is provided, comprising deploying at least one joint from a sill attached to a vehicle, and rotating the at least one joint such that an arm coupled to the at least one joint extends outward from the vehicle.

According to another embodiment of the present invention, a vehicle cargo rack is provided, comprising means for slidably deploying a sill from the vehicle, and means for rotatably supporting an arm attached to the sill.

DETAILED DESCRIPTION OF THE PREFERRED EMBODIMENTS

Reference will now be made in detail to presently preferred embodiments of the invention. Wherever possible, the same reference numbers will be used throughout the drawings to refer to the same or like parts.

Figure 1:
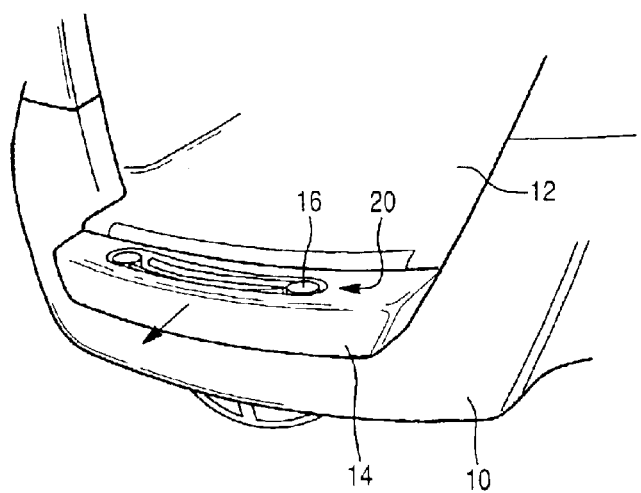
FIG. 1 is a perspective view of a cargo rack undergoing deployment according to an embodiment of the present invention.

As shown in FIG. 1, the rear end of a vehicle 10 (e.g., a minivan, sport utility vehicle, etc.) has a sill 14, such as a step, which contains rack 20 for holding and supporting gear (e.g., a bicycle, snowboard, etc.). The sill 14 is connected to the vehicle 10 so that it can be slid in a horizontal direction (for example, manually using a handle recessed in the sill or via a motorized drive). When the sill 14 is slid outward (in a direction away from the vehicle 10), a top surface of the sill 14 is approximately level with an interior or "cargo" surface 12 of the vehicle 10. The sill 14 is preferably designed and configured to be able to support the weight of a human, so that the sill 14 can be used as a step or surface on which a human can stand in order to gain access to a roof rack (not shown) on a top surface of the vehicle 10.

Preferably, the sill 14 can be locked in an inward "stored" position, so that an outer surface of the sill 14 is approximately flush with an outer surface of the vehicle 10 and the sill 14 does not protrude outward from the vehicle. Also, according to one embodiment of the present invention, the sill 14 may be locked in an outward "deployed" position, where the sill 14 can be used as a step or as a support for a bike (via the rack 20).

Figure 2:
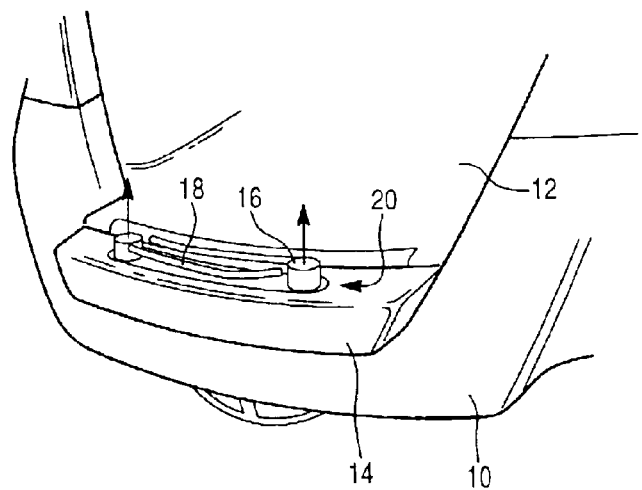
FIG. 2 is a perspective view of the cargo rack of FIG. 1 undergoing further deployment according to an embodiment of the present invention.
Figure 3:
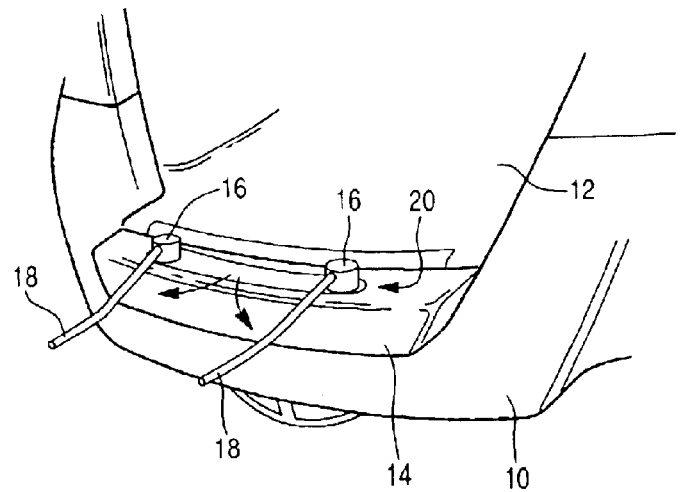
FIG. 3 is a perspective view of a fully deployed cargo rack according to an embodiment of the present invention.

The sill 14 preferably includes rack 20, which has two joints 16, each joint being connected to a respective arm 18. The joints 16 are horizontally rotatable-i.e., they can be rotated with respect to the vehicle 10 about a vertical axis. The rack 20 is connected to the sill 14 so that it can be slid in a vertical direction with respect to the sill 14. When the rack 20 is in a lower "stored" position, as shown in FIG. 1, a top surface of each of the joints 16 is approximately flush with the top surface of the sill 14, and the arms are below the top surface of the sill 14 so that they are not exposed. When the rack 20 is in an upper "deployed" position, as shown in FIGS. 2 and 3, the arms 18 are above the top surface of the sill 14, so that they can rotate with joints 16 with respect to the sill 14. When the rack 20 is in its lower position, the sill 14 can be used as a step, as discussed. When the rack 20 is in its upper position, the rack 20 can be used to support gear (e.g., a bicycle, snowboard, etc.) by swinging out the arms 18 so that their free ends face a direction away from the vehicle, as shown in FIG. 3.

Preferably, the rack 20 can be locked in one or both of its two positions. According to one embodiment of the present invention, the rack 20 may be locked in one of the upper and lower positions using a "touch-and-pop" mechanism, in which, when the rack 20 is in the lower position, the rack 20 can be moved to the upper position by lightly pushing down on the rack 20 and then releasing. A spring or other similar device in the touch-and-pop mechanism then pushes the rack 20 into the upper position. Similarly, the rack 20 can be returned to the lower position by pushing down on the rack 20 to a position slightly beyond (or lower than) the lower position and then releasing.

When the rack 20 is in its upper position, the arms 18 can rotate via the joints 16. Preferably, the rotation of the joints 16 is limited so that the arms 18 can only swing between a closed position (as shown in FIG. 2) and an open position (as shown in FIG. 3). In a closed position, the arms 18 are approximately parallel to an axis passing through the width of the vehicle 10 (i.e., a major axis of the sill) and an unattached or free end of each arm 18 points in a direction of the joint 16 of the other arm 18. In an open position, the arms 18 are approximately perpendicular to the major axis of the sill and the unattached or free end of each arm 18 points in a direction away from the vehicle 10. In other words, each joint 16 is configured to rotate through an angle of approximately 90° from a position in which the arms 18 are closed to a position in which the arms 18 are open. In one embodiment, the arms 18 may lock in one of the open and closed positions.

The arms 18 may be bent, as shown in FIG. 3, so that there is a slight dip or groove in the approximate middle of each arm 18 to help stabilize or prevent movement of a bicycle that is supported by the rack 20. The arms may be configured other than as shown in FIG. 3 and may include additional curves, hooks, and other features. The arms 18 may also have a protective coating, such as rubber, to pad the bicycle and prevent damage or scratches. The joints (and the free ends of the arms 18 when the arms are in the open position) may be separated by a distance of approximately 20 inches.

The operation of the rack will now be described. Starting from an initial position in which the sill 14 is in the inward position, the sill 14 can be slid (e.g., manually) to the outward position. While the Figures show the interior surface 12 of the vehicle 10, in which case the hatchback door or lift gate door (not shown) is open, the rack may also be operated while the hatchback door/lift gate door is closed. The sill 14 may then be used as a step or support. To use the rack 20, the rack 20 can be moved from a lower position (FIG. 1) to an upper position (FIG. 2) by, for example, slightly pushing down on the rack 20 and then releasing, by lifting the arms 18 and then rotating them, etc. If a touch-and-pop or press-and-release mechanism is used, the arms 18 are then rotated from a closed position (FIG. 2) to an open position (FIG. 3) after the joints 16 are raised. The door is then preferably closed, at which point a bicycle or the like may be mounted on top of the arms 18 and held in place, for example, using rope or elastic ties. It should be appreciated that while the Figures show the door open during initial deployment, the door is preferably closed after the arms 18 are deployed. Alternatively, the sill 14 may, in some embodiments, be slid out while the door is closed, thus not necessarily requiring the door to be open for deployment of the rack.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. For example, the vertical height between the arms (in the deployed position) and the top of the sill may be varied. The embodiments were chosen and described in order to explain the principles of the invention and its practical application and to enable one skilled in the art to utilize the invention in various embodiments and with various modifications as are suited to the particular use contemplated. It is intended that the scope of the invention be defined by the claims appended hereto, and their equivalents.

What is claimed is:

1. An integrated bike rack for a vehicle, comprising:
   a sill horizontally slidably connected to the vehicle; and
   a rack vertically slidably connected to the sill,
   wherein the rack comprises at least two horizontally rotatable joints, each joint having an arm configured to support a bicycle.

2. The integrated bike rack as in claim 1, wherein the sill is slidable between an inward and an outward position, the rack is slidable between a lower and an upper position, and the arms are rotatable between a closed and an open position.

3. The integrated bike rack as in claim 2, wherein the rack utilizes a touch-and-pop mechanism.

4. The integrated bike rack as in claim 2, wherein each joint is configured to rotate through an angle of approximately 90° from a position in which its arm is approximately parallel to a major axis of the sill to a position in which its arm is approximately perpendicular to the major axis of the sill.

5. The integrated bike rack as in claim 4, wherein when the arm of each joint is approximately parallel to the major axis of the sill, an unattached end of the arm points in a direction of the other joint, and when the arm of each joint is approximately perpendicular to the major axis of the sill, the unattached end of the arm points in a direction away from the vehicle.

6. The integrated bike rack as in claim 1, wherein a distance between the two joints is approximately 20 inches.

7. The integrated bike rack as in claim 1, wherein the sill has a shape of a step.

8. A vehicle cargo rack, comprising:
   a sill retractably connected to a vehicle;
   at least one rotatable joint mounted on said sill; and
   at least one arm coupled to said at least one rotatable joint and configured to hold cargo.

9. The cargo rack as in claim 8, wherein said at least one rotatable joint is retractable, said at least one rotatable joint being positionable in at least a deployed position and a stored position.

10. The cargo rack as in claim 8, wherein the at least one joint comprises two joints rotatable in opposite directions about a substantially vertical axis.

11. A vehicle cargo rack, comprising:
    a sill connected to a vehicle;
    at least one rotatable joint mounted on said sill; and
    at least one arm coupled to said at least one rotatable joint and configured to hold cargo,
    wherein said at least one rotatable joint is substantially within said sill when in said stored position.

12. The cargo rack as in claim 11, wherein said at least one rotatable joint includes a top surface substantially flush with a top surface of said sill when in said stored position.

13. A vehicle cargo rack, comprising:

a sill connected to a vehicle;

at least one rotatable joint mounted on said sill; and at least one arm coupled to said at least one rotatable joint and configured to hold cargo, further comprising:

one of a touch-and-pop mechanism and a press-and-release mechanism coupled to said at least one rotatable joint for retractably positioning said at least one joint.

14. A method of securing cargo to a vehicle, comprising:

deploying at least one joint from a sill attached to a vehicle;

rotating said at least one joint such that an arm coupled to said at least one joint extends outward from said vehicle; and sliding said sill outward from said vehicle.

15. The method of claim 14, further comprising:

locking said sill in an outward position.

16. The method of claim 14, further comprising:

locking said at least one joint in a deployed position.

17. A vehicle cargo rack, comprising:

means for slidably deploying a sill from a vehicle; and means for rotatably supporting an arm attached to said sill.

18. The cargo rack as in claim 17, further comprising:

means for retractably deploying said means for rotatably supporting within said sill.

19. The cargo rack as in claim 18, further comprising:

means for locking said means for retractably deploying.

* * * * *